United States Patent [19]

Hackman et al.

[11] Patent Number: 4,930,565
[45] Date of Patent: * Jun. 5, 1990

[54] MELT OVERFLOW SYSTEM FOR PRODUCING FILAMENTARY AND FILM PRODUCTS DIRECTLY FROM MOLTEN MATERIALS

[75] Inventors: Lloyd E. Hackman, Worthington, Ohio; James Dickson, Stirling, N.J.; David L. Dunlap, Gahanna, Ohio; Mark E. Handshey, Columbus, Ohio

[73] Assignee: Ribbon Technology Corporation, Gahanna, Ohio

[ * ] Notice: The portion of the term of this patent subsequent to Mar. 21, 2006 has been disclaimed.

[21] Appl. No.: 278,016

[22] Filed: Nov. 30, 1988

Related U.S. Application Data

[63] Continuation of Ser. No. 89,544, Aug. 26, 1987, Pat. No. 4,813,472, which is a continuation-in-part of Ser. No. 819,474, Jan. 16, 1986, abandoned, which is a continuation of Ser. No. 561,309, Dec. 14, 1983, abandoned.

[51] Int. Cl.$^5$ .............................. B22D 11/06
[52] U.S. Cl. .................................. 164/463; 164/423; 164/429; 164/479
[58] Field of Search ............... 164/463, 423, 427, 428, 164/429, 479; 264/214, 165

[56] References Cited

U.S. PATENT DOCUMENTS

| | | | |
|---|---|---|---|
| 993,904 | 5/1911 | Strange | 164/429 |
| 2,304,206 | 12/1942 | Reichel . | |
| 3,871,439 | 3/1975 | Maringer et al. | 164/423 |

Primary Examiner—Kuang Y. Lin
Attorney, Agent, or Firm—Frank H. Foster

[57] ABSTRACT

A heat extracting substrate is moved along a melt front formed at the edge of the surface of a molten material so that a layer of molten material is deposited on the substrate, cooled and removed from the substrate to form ribbon, filaments, fiber or film directly from the molten material. The edge may be formed by providing an upper edge upon a portion of the wall of a receptacle lower than the top of the receptacle. The molten material may be overflowed over this relatively horizontal edge and against the moving substrate surface.

9 Claims, 4 Drawing Sheets

MELT OVERFLOW SYSTEM FOR PRODUCING FILAMENTARY AND FILM PRODUCTS DIRECTLY FROM MOLTEN MATERIALS

This application is a continuation of our copending application Ser. No. 089,544, filed Aug. 26, 1987, now Pat. No. 4,813,472, which was a continuation-in-part of application Ser. No. 819,474, filed Jan. 16, 1986 and now abandoned, which was a continuation of application Ser. No. 561,309, filed Dec. 14, 1983 and now abandoned.

FIELD OF THE INVENTION

This invention is directed generally to a method and apparatus for producing filamentary, fibrous, ribbon or film materials and more particularly relates to a system for producing such materials directly from a molten material, such as metals, polymers and ceramics by moving the surface of a chilled substrate past a region of contact with the molten material to form a rapidly solidifying layer of the material on the substrate and then cooling the layer and removing it from the substrate.

BACKGROUND ART

The prior art discloses a variety of methods and apparatus which produce solid material directly from a source of molten material. Most prior art systems are for the fabrication of metal products and use some type of fixed, rigid, noncontrollable forming orifice to stabilize the dimensions of the product.

A typical system of this type is illustrated in U.S. Pat. No. 2,825,108 to Conn in which molten metal is made into a filamentary form by forcing it through an orifice so as to generate a free standing stream of molten material which is subsequently solidified into filamentary form on a rotating, heat extracting member. The rate of production is determined by the rate at which the molten material is expelled from the orifice and for continuous filament this rate must be approximately synchronous with the rate of movement of the heat extracting member at its point of contact with the filament.

Techniques of this type are troubled by the relative complexity of the necessary process control system and the difficulty in passing a molten material through fixed, small orifices. The orifices must be constructed from an exotic material if the molten material has a relatively high melting point. The orifices have a tendency to erode and/or become partially or completely blocked due to the deposit of material on the orifice.

An improvement is disclosed in U.S. Pat. No. 3,838,185 to Maringer et. al. That patent discloses a disk-like heat extracting substrate which is rotated and lowered into the upper surface of a molten material. The peripheral edge of the disk-like substrate moves generally parallel to the surface of the molten material. More specifically, the edge moves slightly downwardly through the surface of the melt into a region of contact and then moves upwardly and out of the melt carrying a layer of molten material which is then chilled as the wheel rotates and carries it away from the surface of the molten material. After the layer is solidified, it is removed from the substrate in the form of a filamentary product without the use of forming orifices.

One difficulty with this system, however, is that, because the heat extracting substrate is inserted downwardly into the surface of the melt, the melt surface must be open and exposed to the atmosphere. This exposure to the atmosphere is a major source of heat loss and therefore increases the energy required to maintain the molten material surface at a suitably high temperature for proper operation of the system. Second, the exposure of the molten material to the atmosphere provides a source of contamination which may be introduced in to the molten material from the atmosphere, permits the escape of relatively volatile constituents from the molten material and allows oxidation reactions to occur at the surface of the melt. It is therefore difficult to maintain a constant chemical composition in the molten material. Further, this system permits limited control because the region of contact of the melt with the substrate must always be at the lower-most segment of the substrate. Thus, control of the process is limited to control of the substrate speed, depth of penetration of the substrate into the surface of the molten material and temperature.

A second system for overcoming some of these objectionable characteristics is disclosed in U.S. Pat. No. 3,896,203 to Maringer et. al. In this system a melted drop of material is adhered to a solid member by means of the molecular attraction of the molten material for the solid member to form an adherent pendant drop. The drop is suspended from the solid member. The drop remains adherent because the net molecular attraction force is greater than the net gravitational force on the drop. The adherent pendant drop is then contacted by a rotating heat-extracting member. The pendant drop may be formed by locally heating the end of a solid member of the material to melt the end. Alternatively, the pendant may be formed, adhered to and suspended from an orifice through which melt is forced, for example by the pressure head exerted by a height of molten material above the orifice.

A variety of difficulties have been encountered in connection with the pendant drop system. A component of the shear forces exerted on the adhered drop by the rotating heat extracting member adds to the gravitational forces and together they tend to detach the drop from the solid member. Furthermore, because the drop was suspended from the solid member by gravity, the rotating substrate normally was beneath or partly beneath the drop. Upon contact of the molten material with the heat-extracting substrate, gravitational forces acted in a direction to move the molten material onto the entire surface of the rotating substrate. If the substrate was of the type having a plurality of raised ridges on its peripheral surface for forming filamentary products on the crests of these ridges, the melt would also flow by gravity down in between the ridges to form ribbons or sheets. Further, if the pendant drop is formed at the end of a piece of solid material from which the droplet is formed by local heating, then an additional manufacturing step is needed. The raw material must first be formed into solid rods or other geometrical shapes and then later locally melt to form the drop. This is not only an extra production step but requires additional energy.

It is therefore an object of the present invention to provide a system for forming ribbon, filaments, fiber or film products directly from a molten material which will not require that the top surface of the molten material be exposed to the atmosphere, which will not permit the shear forces exerted on the melt at the region of contact between the heat-extracting or chilled substrate and the melt to have a tendency to detach a large mass of the melt from the main body of molten material and which additionally will permit the molten material to be formed by a single melting step in which the component raw materials are melted in a receptacle and used directly to form the resulting products.

In addition to providing the combination of these three advantages, it is a further object of the present invention to provide a system which overcomes forces which tend to urge the molten material to fall into the valleys between a plurality of ridges formed on a cylindrical, rotating, chilled substrate.

Yet another object of the present invention is to provide a system in which the substrate can be moved at a significant velocity past a small confined region of contact with the molten material without materially disturbing the stability of the pool of the molten material.

Other objects and features of the invention are described below or will become apparent from the following description.

SUMMARY OF THE INVENTION

The invention is an improved method and an improved apparatus for producing ribbon, filaments, fiber or film directly from a molten material by moving the surface of a heat-extracting substrate past a region of contact with the molten material to form a layer of material on the substrate, then cooling the material and removing it from the substrate.

In the present invention the substrate surface is moved along a region of contact at an edge of the upper surface of the molten material in the direction generally transversely to the plane of the molten material surface. Bounding the region of contact is an upper meniscus which is adjacent the upper surface of the molten material.

The method is best accomplished using a receptacle for containing the molten material. The receptacle includes a portion of the wall of the receptacle which has an upper, generally horizontal edge which is relatively lower than the top of the receptacle. The molten material is filled to a level such that it overflows this edge. A movably mounted heat extracting substrate is spaced from the edge and mounted to be contacted by the overflowed molten material substantially at the level of the upper surface of the molten material.

The moving substrate surface is effectively substituted for a portion of the container wall which is absent above the substantially horizontal edge. The melt is overflowed against that substrate surface.

An advantage of the present invention is that no drop is formed and therefore there is no drop to be subject to detachment by gravity. Further, the gravitational force exerted upon the molten material at its region of contact with the moving substrate is generally opposite to the shear forces exerted upon the molten material by the movement of the chilled substrate past this region of contact. This also allows the substrate to move at a higher velocity past its region of contact with the molten material thereby increasing production rates. The present invention more rapidly solidifies the molten material than can be done with conventional melt extraction and permits the manufacture of finer wire products.

A further advantage is that the surface of the molten material may be covered with a protective barrier and insulative cover to isolate the melt from the atmosphere since only the edge of that melt surface need be in contact with the heat-extracting substrate.

Furthermore, the substrate may be of the cylindrical, belt or disk type and can be adjustable both vertically with respect to the melt surface and laterally for varying the spacing of the substrate from the overflow edge. This permits improved control of the formation of the products and their trajectory as they are removed from the substrate. A rotating substrate of circular cross section may have its region of contact with the molten material positioned at almost any of the 360° of angular positions about its periphery.

Products of the invention are made without the use of a forming orifices or the need for an extra prepatory manufacturing step of preparing solid materials for localized melting to form a drop.

A further advantage of the present invention is that it permits the use of skull melting with directed energy beams for reactive metals or metals requiring a high purity. In addition, the chill from the substrate can quench, slag or metal at the overflow region. The system is designed for sufficient melt to provide chemical control and homogeneity of the resulting product while giving surface stability and reducing thermal currents. A protective atmosphere can be introduced to push the overflow melt front against the substrate as may be needed and can be used to provide a controlling head.

The advent of fiber reenforced composites has created a demand for filamentary and film material of refractory metals and alloys. However, these materials are extremely difficult to form by conventional mechanical methods into filaments and films. The present invention has been found to be capable of forming such products with these materials in sizes as low as 15 microns in effective diameter. Thus, making these products available at considerably reduced cost.

In describing the preferred embodiment of the invention, which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

Figure 1:
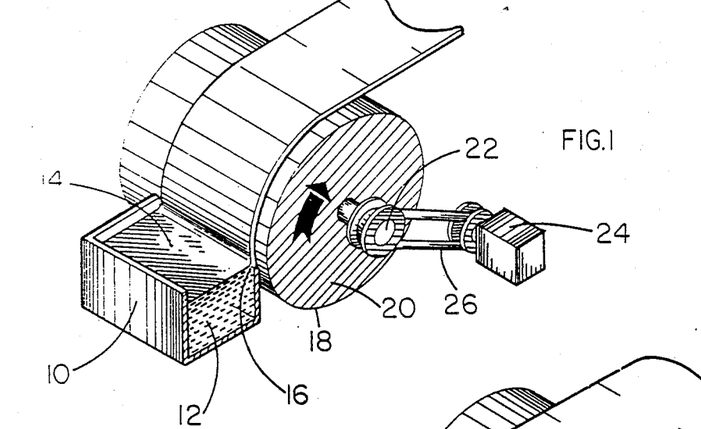
FIGS. 1-4 are diagrammatic illustrations of the principles of the present invention.

FIG. 1 illustrates a receptacle 10 which is heated in a conventional manner and contains a pool of molten material 12. However, instead of the walls of the container everywhere extending above the upper surface 14 of the molten material 12, a portion of the container wall is absent in the region above a generally horizontal edge 16 which is formed at the top of a portion of the wall of the receptacle 10. The edge 16 is lower than the top of the other walls of the receptacle 10 so that the molten material level may be raised sufficiently to overflow the molten material over the edge 16.

In place of the wall which is missing above the edge 16 there is positioned the peripheral surface 18 of a cylindrical heat extracting substrate 20 which is rotated about its pivot axis 22. The heat extracting substrate 20 is spaced from the edge 16 and is preferably vertically and horizontally adjustable relative to the edge 16 to permit the spacing from the edge to be controllably varied and also to permit adjustment of the angular position about the cylindrical substrate 20 at which the molten material 12 contacts the surface 18 of the substrate 20.

A conventional means such as an electrical motor 24 and connecting drive means 26 are provided for driving the surface 18 of the substrate past the region of its contact with the melt 12. In most applications it is driven at a substrate surface speed in the range of 150 to 8000 feet per minute.

Preferably the overflow edge 16 is linear and the cylindrical substrate 20 is spaced equidistantly from all points along the edge 16. However, the edge may be contoured and the substrate contoured in a mating form to provide contoured products. Further, the spacing of the edge 16 from the substrate surface 18 may be varied along the length of the edge 16 and the edge 16 may be angled slightly from perfectly horizontal in order to provide a resulting product of varying thickness and for otherwise varying the characteristics of the products of the invention.

Figure 2:
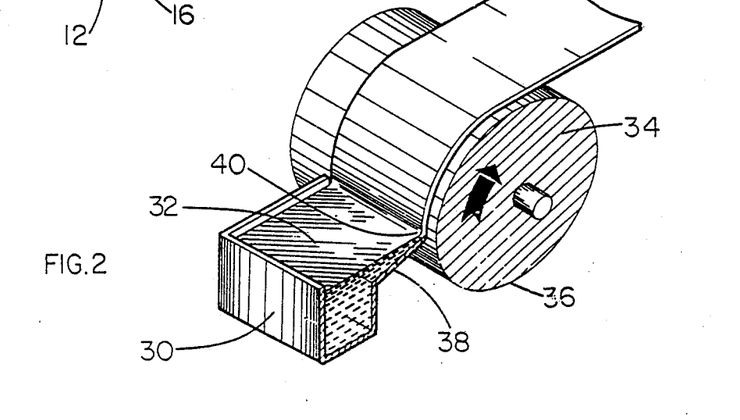

FIG. 2 illustrates a similar receptacle 30 containing a molten material or melt 32 and a rotating cylindrical substrate 34. However, in order to dispose the surface 36 of the rotating substrate 34 further away from the main portion of the receptacle 30, a trough or lip 38 is formed in the wall of the receptacle 30 to extend outwardly from it. An edge 40 at the outer extremity of the lip 38 is positioned below the other top edges of the receptacle 30 so that the melt 32 may be overflowed against the heat-extracting surface 36 of the substrate 34 to operate in the manner described in connection with FIG. 1.

Figure 3:
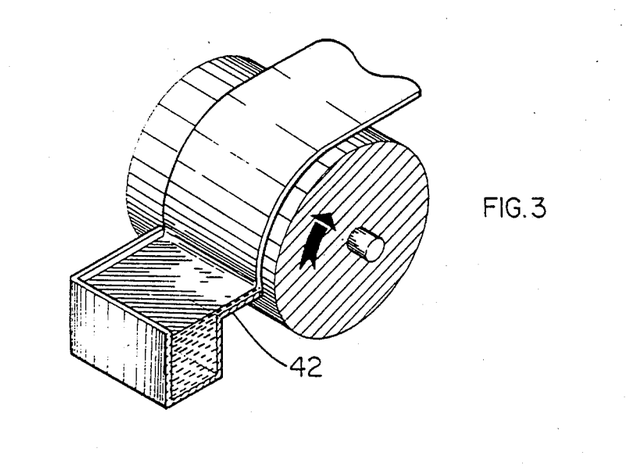

FIG. 3 illustrates a similar structure in which the lip 42 is essentially horizontal so that the overflow edge has a substantial horizontal width.

Figures 4, 5:
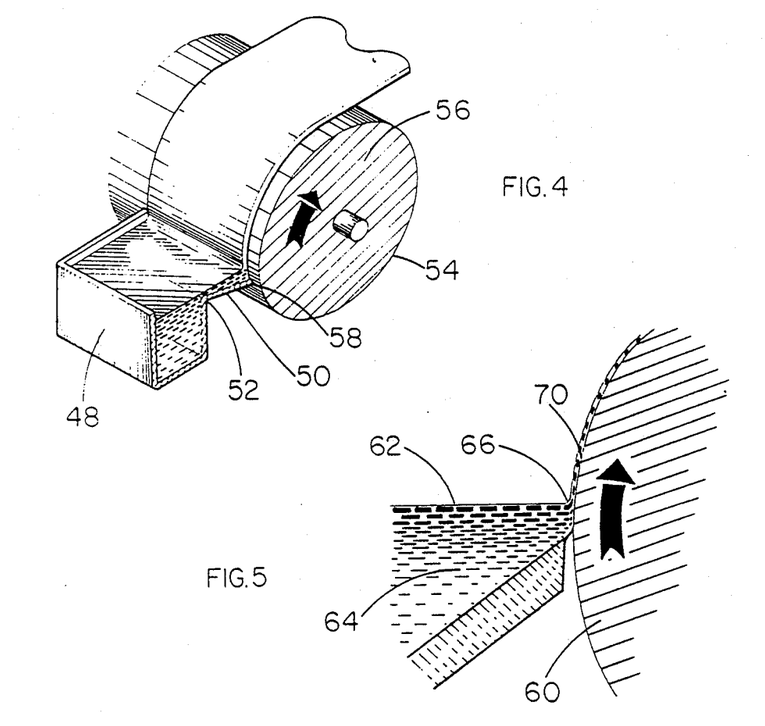
FIG. 5 is an enlarged view in vertical section illustrating a melt front forming a region of contact of the melt with a heat-extracting chilled substrate.

FIG. 4 illustrates yet another embodiment in which the receptacle 48 is formed with a downwardly inclined lip 50. However, in this embodiment of FIG. 4 the edge 2 over which the melted material is overflowed is spaced considerably further from the surface 54 of the heat extracting substrate 56. In this embodiment a secondary edge 58 is formed more nearly adjacent to the substrate 56.

As illustrated in FIG. 5 and applicable to all embodiments of the invention, the substrate 60 is moved along a region of contact or a melt front positioned at an edge of the upper surface 62 of a molten material 64. The heat extracting surface moves generally transversely or obliquely to the plane of the molten material surface 62. An upper meniscus 66 is the upper boundary of the region of contact of the molten material with the surface 60. This upper meniscus is formed adjacent to the upper surface 60 of the molten material 64.

As illustrated in FIG. 5 the layer of molten material 70 which is formed on the surface 60 is carried upwardly away from the molten material for cooling and removal from the surface 60.

By contacting the molten material with the substrate at an edge of the molten material, the substrate may be positioned away from the main body of the receptacle to permit the receptacle to be covered with an insulative barrier. It also permits the molten material to be contacted by the heat-extracting substrate without the formation of a drop which would be subject to detachment. Further, it permits the shear forces induced by the moving surface 60 in the molten material to be upward and opposite from the downward force of gravity.

The area of the melt front which contacts the heat extracting surface may be controlled by the vertical or horizontal positioning of the rotating substrate and also by control of the height of the surface 62 of the molten material. The height of the melt front is determined by the height of the surface of the molten material above the edge over which the melt is overflowed. Neither the height of the melt front nor the rate at which melt is transported to the moving substrate is significantly dependent upon forces of gravity to move the molten material in any downward direction.

Figure 6:
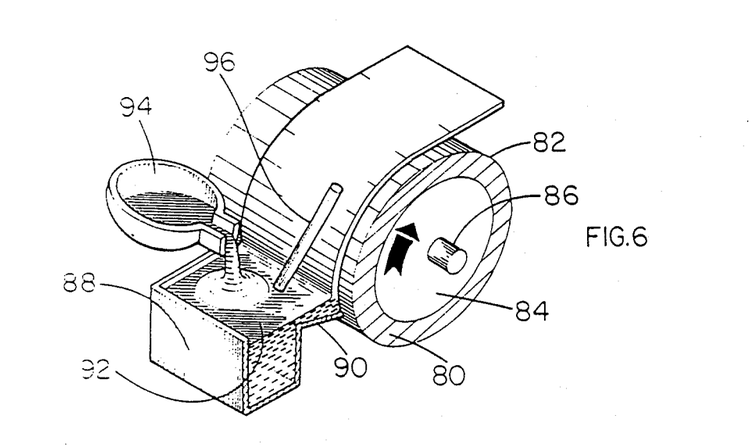
FIG. 6 is a view in vertical section through the melt receptacle and a cylindrical rotating substrate of an embodiment of the present invention.
Figure 7:
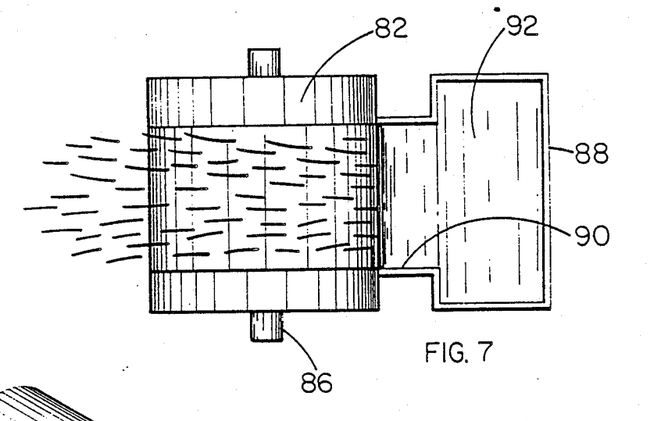
FIG. 7 is a top plan view of the embodiment of FIG. 6 except that the structure is modified to produce wire.

FIGS. 6 and 7 illustrate a heat extracting substrate 80 in the form of a cylindrical outer shell 82 supported by a carrier body 84 constructed of a material such as iron or steel and provided with axial trunions 86. The substrate 80 is rotated in suitable bearings about its axial trunions 86 by means of a conventional drive such as an electric motor and gear transmission means or other similar well known drive arrangement.

A crucible 88 having a lip 90 provides a suitable receptacle for the molten material 92. The lip or trough 90 delivers an elongated molten edge to the substrate 80 in a position which is somewhat remote from the crucible 88. A layer of molten material is picked up by the surface 82 of the substrate 80 at the elongated edge or melt front, solidified and subsequently removed.

FIG. 6 illustrates the manufacture of sheet while FIG. 7 shows the manufacture of wire, each having a substrate surface appropriate for producing the desired product.

A fresh supply of molten material may be delivered to the crucible 88 at a controlled rate by a conventional means such as a ladle 94. Alternatively, material such as solid bar stock 96 may be lowered into the molten material at a controlled rate. The introduction of solid material at a controlled rate into the surface of the molten material permits control of the level of the surface of the molten material. Alternatively, of course, level control may be accomplished by controllably raising or lowering a solid body which will not melt at the temperature of the molten material so as to insert or withdraw the body from the liquid and thereby raise or lower its surface level. Preferably, level control of the melt surface above the overflow edge can be accomplished by controlled tilting of the receptacle at a selected angle.

Figure 8:
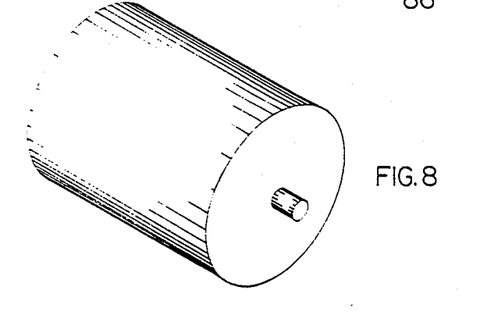
FIGS. 8-11 are side views of representative cylindrical chilled substrates which may be utilized with embodiments of the present invention.
Figure 9:
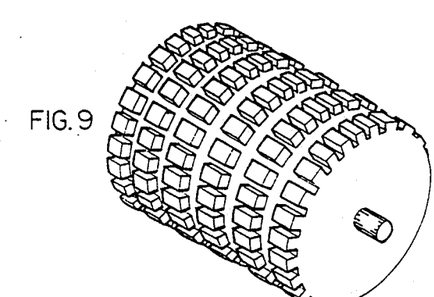
Figure 10:
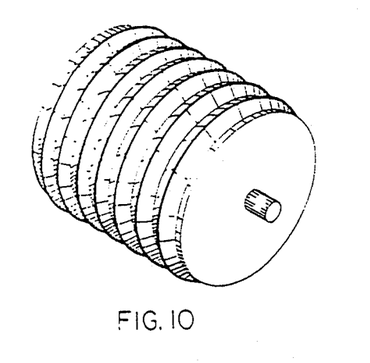
Figure 11:
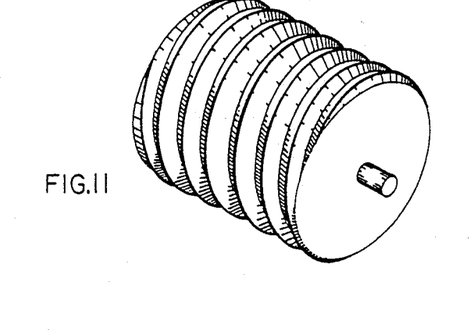

FIGS. 8–11 illustrate representative surface contours which may be formed on the heat extracting substrates which are used with the present invention. FIG. 8 illustrates a smooth, flat, cylindrical surface suitable for forming ribbon products. FIG. 9 illustrates circular, coaxial, laterally spaced and flat topped ridges which are segmented so that short, discrete ribbons of material are fabricated. FIG. 10 illustrates circular concentric sharp ridges formed about a cylinder to form continuous spaced ridges having intermediate valleys. FIG. 11 illustrates a cylindrical substrate surface having a helically formed spiral shaped ridge to provide a continuous edge. The ridges may, for example, be machined at a pitch of 28, 32 or 40 ridges per inch. Notching the machine ridges provides discontinuities causing fibers or ribbons of discrete length to be generated.

The substrates of FIGS. 10 and 11 fabricate discrete or continuous fibers of material. The substrate of FIG. 11 is preferred because the helical or spiral ridges migrate laterally along the melt front or melt edge. When rotated this helps prevent molten material from flowing into the valleys between the ridges in the event the production of fibers is desired. As an alternative, the cylindrical substrate of FIG. 10 can be mechanically reciprocated in its axial direction.

A double helix, also called a two-start per revolution helix, results in faster ridge migration and is generally more effective in keeping the melt out of the grooves.

Figure 12:
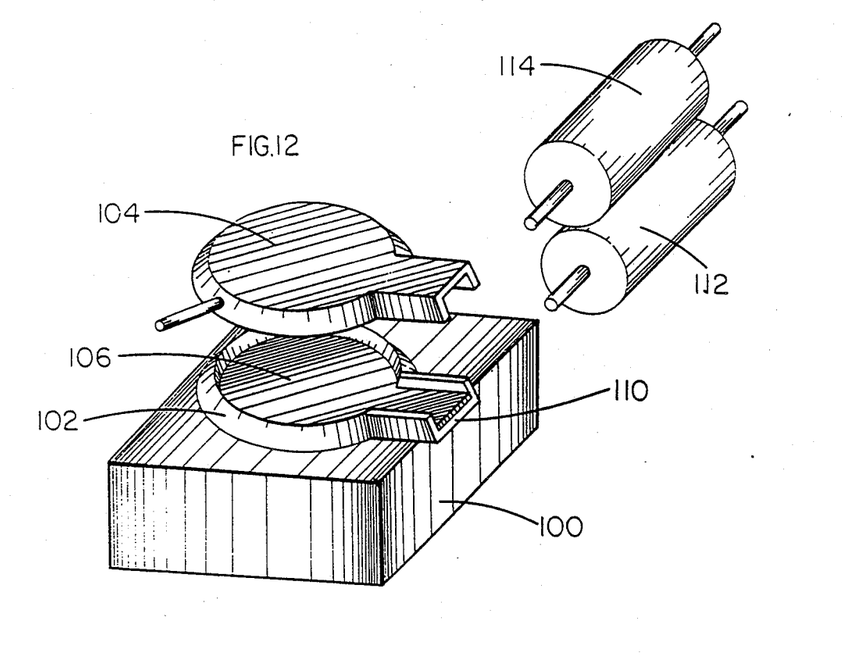
FIG. 12 is an exploded view in perspective illustrating the preferred embodiment of the invention.

FIG. 12 illustrates a preferred embodiment of the invention in which a furnace 100 has a centrally mounted crucible 102 for heating and melting a material and maintaining it in the molten state. A protective, insulative cover 104 is positioned above the crucible 102 for reducing heat loss and providing a barrier between the molten material 106 and the atmosphere. A gas or electric burner may be mounted within the cover 104 and connected to a suitable source of energy. A trough or lip 110 extends laterally near the top of the crucible 102 in the manner described above. A cylindrical, cooled substrate 112 is positioned against the melt front formed at the outer edge of the trough 110 for forming products directly from the melt in the manner described above. The cooled and solidified melt spontaneously releases or in the alternative lift off structures may be used to insure the removal prior to recontacting the molten source. A wiper roll 114 is rotatably mounted above and in contact with the substrate roll 112 to insure that the layer or film of molten material which is deposited upon the substrate is removed from the substrate prior to the recontact of the molten material by the substrate's surface.

Figure 13:
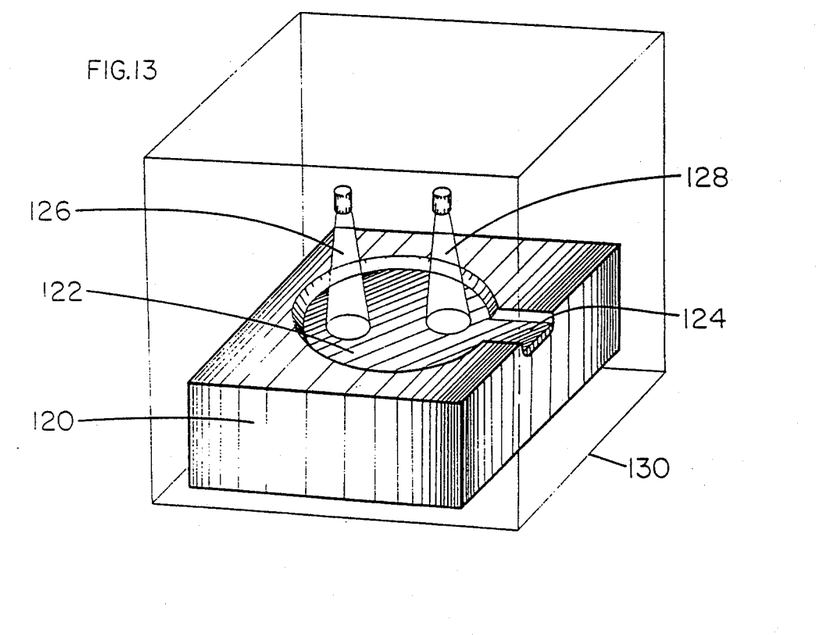
FIG. 13 is a view in perspective illustrating an alternative embodiment of the invention utilizing directed energy beams for heating the molten material.

FIG. 13 illustrates yet another embodiment of the invention in which a hearth 120 has a receptacle formed therein for containing the molten material 122. A feeder trough 124 forms a lip to permit access of the melt surface to the cylindrical substrate. The material in the receptacle formed in the hearth 120 may be melted and maintained in a molten state by means of directed energy beams 126 and 128 which may, for example, be electron beams, plasma beams, electric arcs, laser beams or the like. Further, the hearth may be placed in a conventional housing 130 having a controlled atmosphere such as an inert gas or vacuum.

The position of the rotating substrate relative to its region of contact with the molten material at the edge of the surface of the molten material is important. As the substrate is positioned higher relative to the region of its contact at the edge of the melt surface, its tendency to make fibers and filaments is increased while its tendency to make ribbon or sheet is decreased. Conversely, as the substrate is positioned lower relative to its region of contact at the edge of the surface of the melt, the opposite tendencies are exhibited.

The form of the products produced by the present invention is effected by many other parameters of the embodiments of the invention and their operation. For example, the pressure head or hydrostatic pressure of the overflowed molten material would be dependent upon the height of the surface of the molten material above the overflow edge. Other parameters include the position of the rotating substrate as described above, the type and rate of material feed i.e., whether solid rod, solid shot, or molten.

The form of the product i.e., whether ribbon or filament is also effected by the heating gas flow (whether reducing flame or inert gas) above the melt and against the overflowed molten edge.

The opening through the side wall of the receptacle at which the melt overflows, extends from above the level of the free surface of the molten material, located in the receptacle, downwardly to the lower, overflow edge, which is positioned at the bottom of the opening. When the molten material overflows the edge, it flows against the substrate to form a melt front at the interface of the molten material and the substrate. The level of the free surface is maintained sufficiently above that edge that the melt front extends downwardly from the level of the free surface of the molten material, farther than the root depth of the ridges on the substrate, and farther than would permit molten material to form and hold a meniscus by surface tension between the edge and the level of the free surface. Thus, surface tension is not able to form and hold the meniscus at the edge and the ridges do not penetrate such a meniscus surface. Instead, the melt is confined by the substrate and if the substrate is removed would flow over the edge and downwardly. The height from the edge over which the molten material flows to the free surface at the top of the melt is farther than the root depth of the ridges. Therefore, it can be seen that, as the substrate rotates, a portion of the ridges is above the melt, a portion of the ridges is below the melt, and a portion of the ridges interfaces the melt at the melt front. The portion of the ridges which is immediately above the edge is further below the free surface than the height or root depth of the ridges.

However, the ridges are migrated substantially horizontally along the overflow edge and this wave-like migration of the ridges prevents the molten material from filling into the bottom of the valleys between the ridges. Preferably, the wave-like migration of the ridges is accomplished by the use of a helically grooved wheel. In this manner the rotation of the wheel itself induces a continuous wave-like migration of the ridges along the edge while simultaneously moving the entire surface vertically upwardly past the melt front.

The operation of the embodiments of the invention may be illustrated by the following examples:

EXAMPLE I

A copper base alloy was melted in an induction furnace configured as in FIG. 4. The induction power supply is operated between 80 and 100 KW to maintain melt and bring the overflow molten material to temperature. A 40-50 KW range is preferred for a quiet pool leading to the overflow edge during withdrawal. Normally nominal lots of 200 pounds of copper are melted. The wheel speed has not been directly measured. On the device used to control wheel speed, the settings from 1 to 10 are used with a 10 inch diameter wheel, 1500-1800 rpm is the normal range. The position of the wheel, wheel speed, melt temperature, melt surface condition and wheel material, wheel surface condition (smooth, segmented, etc.), wheel surface cleanliness and wheel surface temperature are considered. In the copper base systems of this Example, filaments or fibers (1 by 2 thousandths of an inch) and ribbons (1-5 thousandths by 1 inch) have been produced.

EXAMPLE II

For steel and nickel-based systems, heat-up power is 80-120 KW and temperature maintenance at 60-80 KW. 40 KW is preferred during casting. The same wheel speeds as in Example I were used. Varying the conditions listed in Example I produced the following forms:

| Alloys | Filaments | Fiber | Film |
|---|---|---|---|
| 304 | x | x | x |
| 310 | x | | |
| 330 | x | | x |
| 60Ni40Fe | | x | |

EXAMPLE III

Using the same conditions as Example I but with a stainless steel alloy (330) both film and filaments were produced as in Example I.

EXAMPLE IV

Using the same conditions as Example I but with a stainless steel alloy (310) fibers were produced using the substrate forms of FIG. 10 and 11.

EXAMPLE V

A nickel base alloy (60Ni 40Fe) as with steels was melted using 80-120 KW in the induction furnace. The melt was maintained at a temperature at 60-28 KW. During casting the power was reduced to 40KW. The same wheel speeds, as in Example I, were used with the substrate surface form of FIGS. 10 and 11.

Experience has shown that higher speeds will produce better fibers and filaments whereas lower speeds of rotation of the substrate are preferred for ribbons and films. A slag gate, not shown, may be used 1-2 inches ahead of the overflow edge where slag may be a problem.

EXAMPLE VI

A molypermalloy nickel base alloy (78 Ni, 18 Fe, 4 Mo) was melted in the induction unit. (FIG. 1). The melt was brought up to a super heat (100° C.) above Tm. The induction power supply was varied from 60-120 KVA. The power was reduced to 40 KVA to create a stagnant bath but was increased to 120 KW when melting replacement stock.

In this example two substrate compositions were used; Copper and Timkin Tool Steel. Both were in a Foil Producing Form. Substrate speed was determined by the observed product quality.

Experience has shown that each substrate composition has different wetting abilities. In this example a Timkin Tool Steel substrate produced a thin, solid, smooth foil at a low speed. The approximate speed was 40% of the 1750 RAM motor with a 7": 10" drive to wheel radius. Therefore 0.4×1750 (100/12)=1429 rpm or 1429 ($\pi$D)=1429 (3.1416) (10/12)=3740.0 ft/min. This foil was low in oxidation. The copper substrate produced a thicker, solid, rough finish foil that was slightly heavier in oxidation.

The migrating ridges not only keep the melt from going down into the bottom of the valleys, but the migration also prevents the melt from falling down the exterior face of the overflow edge or lip. In experiments, we have found that when there is no migration, such as when concentric ridges are used without reciprocation, melt leaks between the overflow edge and the substrate and falls upon the floor. When migration is used, such leakage ceases.

The present invention also permits fibers to be made which both are thinner and more uniformly thin than fibers which may be made by the melt extraction process of the above cited Pat. No. 3,383,185. The reason is that thinner fibers are produced when each point on the ridges spends less time travelling across the melt front thereby allowing less metal to freeze upon each ridge surface. Because fiber thickness is a function of the time a ridge interfaces with the melt front, more consistently uniform fibers are maintained when that time remains more nearly constant.

A problem with the melt extraction process of Maringer is that the ridged surface passes through the melt nearly tangentially to the surface of the melt. For this reason turbulence of a selected amplitude on the surface of the melt in a melt extraction system produces a considerably greater variation than with the melt overflow system of the present invention in the circumferential length or the arc between the entry and the exit of the chilled substrate into contact with the melt front. The result is greater variation in fiber thickness.

Variations in the arc of contact between the melt front and the cylindrical substrate also result from variations in the circumferential length of a meniscus of melt where the substrate surface exits the melt. This exit meniscus is more stable with melt overflow than with melt extraction. The reason for the improved stability is that in melt overflow the shear force which tends to lift the meniscus above the surface of the melt is more closely opposed to the force of gravity. In a melt overflow system, these opposite forces tend to reach a stable equilibrium. In melt extraction, however, the shear force is more nearly perpendicular to the force of gravity. There is no substantial opposite force. Therefore the exiting meniscus in melt extraction is less stable so it varies over a broader range.

There is another factor which also contributes to the greater stability, with melt overflow, of the arc between the melt entry line and the melt exit line for the chilled substrate. In melt overflow, the melt entry line is sharply defined by the overflow edge at the bottom of the melt front and is therefore at a relatively fixed position. In contrast, with melt extraction the melt entry line is at the intersection of the periphery of the substrate and the surface of the melt. Therefore, it can vary in response to turbulence on the surface of the melt.

Because of the greater stability of the length of the arc of contact between the substrate and the melt front, the melt overflow system permits the use of a smaller melt arc of contact than the longer tangential arc of melt extraction.

By controlling the height of the melt surface above the furnace lip, the length of the art of contact between the substrate and the melt front can be readily held to a desired minimum dimension, thus allowing the production of thin fiber resulting from a short freeze time.

In melt extraction the edges of the substrate must be depressed far enough into the surface of the melt to break through the oxide film that is present, to actually depress the surface of the melt sufficiently to overcome the melt surface tension, and to then achieve sufficient wetting of the substrate edges by the molten pool to cause fibers to form. The depression of the free surface of the pool by and at the substrate can readily be seen by the most casual observation.

The need to closely control and limit the depth of penetration of the edges of the substrate into a free surface which is itself depressed by and at the substrate presents a critical combination of requirements which prevents the reliable production of thin product. The removal of slag, oxides and fibers from the surface of the melt also distrubs this critical balance. As a result, the arc of contact between the melt and the substrate in melt extraction cannot be maintained reliably at a length which is as small as can be maintained with melt overflow, nor can it be maintained within as close tolerances.

Another advantage of the melt overflow method over the melt extraction method is that ridges may be used which are considerably closer together than may be used with melt extraction. With melt overflow, the ridged substrate may have two or three times as many ridges per longitudinal inch than is possible with melt extraction. This may be accomplished because the melt does not have an opportunity to freeze and bridge across from ridge to ridge in melt overflow because, in melt overflow the substrate ordinarily spends less time in the melt because the arc of contact between the melt front and the substrate may be smaller as described above. In fact, we have found from experiments that substrates which are used with melt overflow will bridge over and do not produce fiber if used with melt extraction and therefore they cannot be used with melt extraction.

One consequent result of having more ridges per inch with melt overflow is a higher production rate. Since each ridge represents the production of a fiber along a segment of its circumferential length, the existence of more ridges per inch of substrate surface parallel to the axis of the substrate means more fibers per inch are produced per revolution of the substrate. In operation we have found that melt overflow is able to produce fibers at a rate two or three times greater, in pounds per hour, than the production rate which is available using melt extraction.

While certain preferred embodiments of the present invention have been disclosed in detail, it is to be understood that various modifications in its structure may be adopted without departing from the spirit of the invention of the scope of the following claims.

We claim:

1. An improved method for producing ribbon, or film from a molten material held in a receptacle, said method being the type wherein a layer of the molten material is solidified on a heat extracting substrate by moving a surface of the substrate past a region of contact with the molten material, cooling the molten material and removing it from the substrate, wherein the improvement comprises:
   (a) forming adjacent ridges surrounding the outer surface of a symmetrical, heat extracting substrate;
   (b) forming an opening through a side wall of the receptacle, the opening extending from above the level of the free surface of the molten material in the receptacle downwardly to a lower edge at the bottom of the opening;
   (c) positioning the heat extracting substrate laterally disposed of the receptacle and adjacent the edge;
   (d) raising the level of the free surface of the molten material in the receptacle above the edge of said opening to cause the molten material to overflow over said edge and against the substrate to form a melt front at the interface of the molten material and the substrate, the level of the free surface being maintained sufficiently above the edge that the melt front interfacing against the substrate extends downwardly from the free surface of the molten material farther than the root depth of the ridges on the substrate and sufficiently far that the molten material cannot form and hold a meniscus by surface tension between the edge and the level of the free surface, but instead is confined by the substrate; and
   (e) rotating the substrate to move the substrate surface past the melt front to form a sheet of material extending across the tips of several ridges.

2. A method in accordance with claim 1 wherein the surface speed of said substrate is in the range 150 feet per minute to 8000 feet per minute.

3. The method in accordance with claim 1 wherein the ridges are effectively migrated by rotation of the substrate along the melt front by forming the ridges in a helical configuration.

4. An apparatus for producing ribbon or film from a molten material, the apparatus comprising:
   (a) a receptacle for containing a pool of molten material at a selected horizontal level for the free surface of the pool, the receptacle having an opening extending from above the free surface level to a bottom edge of the opening, the bottom edge being sufficiently below the free surface level that the molten material can not form and hold a meniscus by surface tension between the edge and the level of the free surface;
   (b) a heat extracting substrate laterally disposed with respect to the receptacle, the substrate having adjacent ridges formed about a generally horizontal axis on the outer surface of a symmetrical, heat extracting substrate and positioned adjacent the edge and the opening for confining the molten material and preventing it from overflowing downwardly out of the receptacle, the positioning of the substrate relative to the edge further being sufficiently low to make ribbon or sheet and not fiber and filaments; and
   (c) drive means drivingly connected to the substrate for continuously moving the surface of the substrate upwardly past the edge and past a melt front formed at the interface of the molten material and the substrate surface at a speed of rotation which is sufficiently slow to make ribbon or sheet extending across several ridges and not fiber or filaments.

5. An apparatus in accordance with claim 4 wherein said edge is linear and said substrate is a rotating, generally cylindrical drum.

6. An apparatus in accordance with claim 5 wherein said drum is vertically and horizontally adjustable relative to said edge.

7. An apparatus in accordance with claim 4 wherein a lip protrudes from said receptacle and said edge is formed at the outermost end of said lip.

8. An apparatus in accordance with claim 4 wherein a lip protrudes from said receptacle and said edge is formed at the inner end of said lip and wherein a second lower edge is formed at the outermost end of said lip near said substrate.

9. An apparatus in accordance with claim 4 wherein said ridge is helically formed about the periphery of the substrate.

* * * * *